United States Patent [19]
Stephenson, III

[11] Patent Number: 5,978,597
[45] Date of Patent: Nov. 2, 1999

[54] ONE-TIME-USE CAMERA WITH BREAK-OFF PROTUBERANCE FOR FILM EJECTION

[75] Inventor: Stanley W. Stephenson, III, Spencerport, N.Y.

[73] Assignee: Eastman Kodak Company, Rochester, N.Y.

[21] Appl. No.: 09/129,475

[22] Filed: Aug. 4, 1998

[51] Int. Cl.⁶ .................................................. G03B 17/02
[52] U.S. Cl. ................................................. 396/6; 396/541
[58] Field of Search ............................ 396/6, 535, 538, 396/541

[56] References Cited

U.S. PATENT DOCUMENTS

| | | |
|---|---|---|
| 3,412,662 | 11/1968 | Balalis .................................... 396/6 |
| 3,593,635 | 7/1971 | Servetnick . |
| 5,148,198 | 9/1992 | Shiba . |
| 5,202,713 | 4/1993 | Nakai et al. . |
| 5,268,713 | 12/1993 | Kataoka . |
| 5,555,054 | 9/1996 | Zander . |

FOREIGN PATENT DOCUMENTS

| | | |
|---|---|---|
| 1060937 | 3/1967 | Germany . |
| 63-271440 | 11/1988 | Japan . |
| 5-66547 | 3/1993 | Japan . |
| 8-146502 | 6/1996 | Japan . |

*Primary Examiner*—Howard B. Blankenship
*Attorney, Agent, or Firm*—Roger A. Fields

[57] ABSTRACT

A one-time-use camera comprising a body having an interior film chamber for an exposed filmstrip and an interior film exit slot from the chamber which allows the exposed filmstrip be moved through the slot to outside the body, is characterized in that the body includes an exterior protuberance projecting from the body which partially includes the slot and has at least one weakened area adjacent the slot to permit the protuberance to be broken off from the body to open whatever portion of the slot remains with the body, in order that the exposed filmstrip can be moved to outside the body.

8 Claims, 4 Drawing Sheets

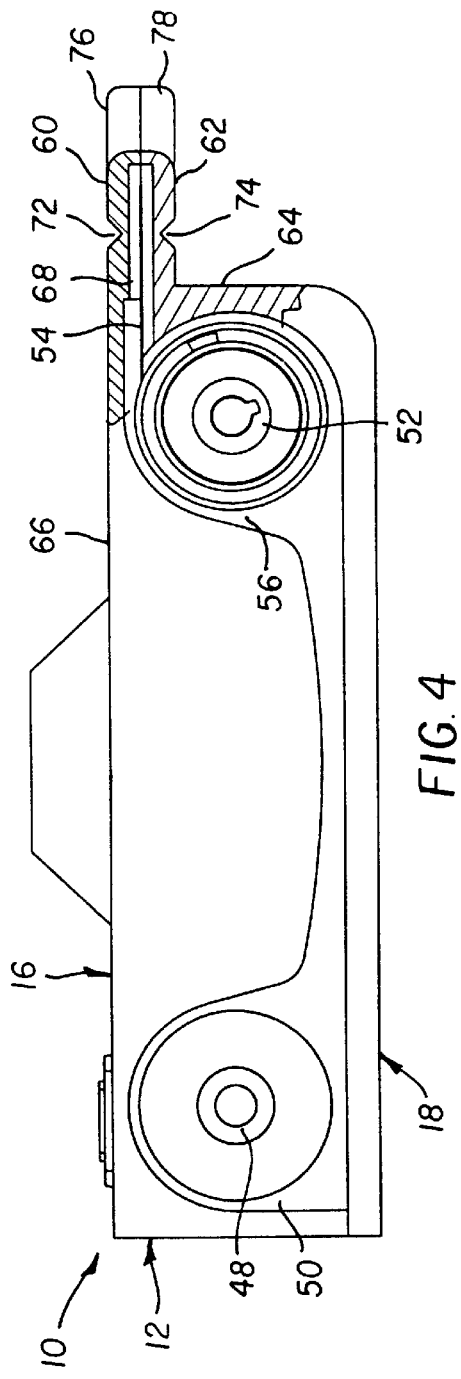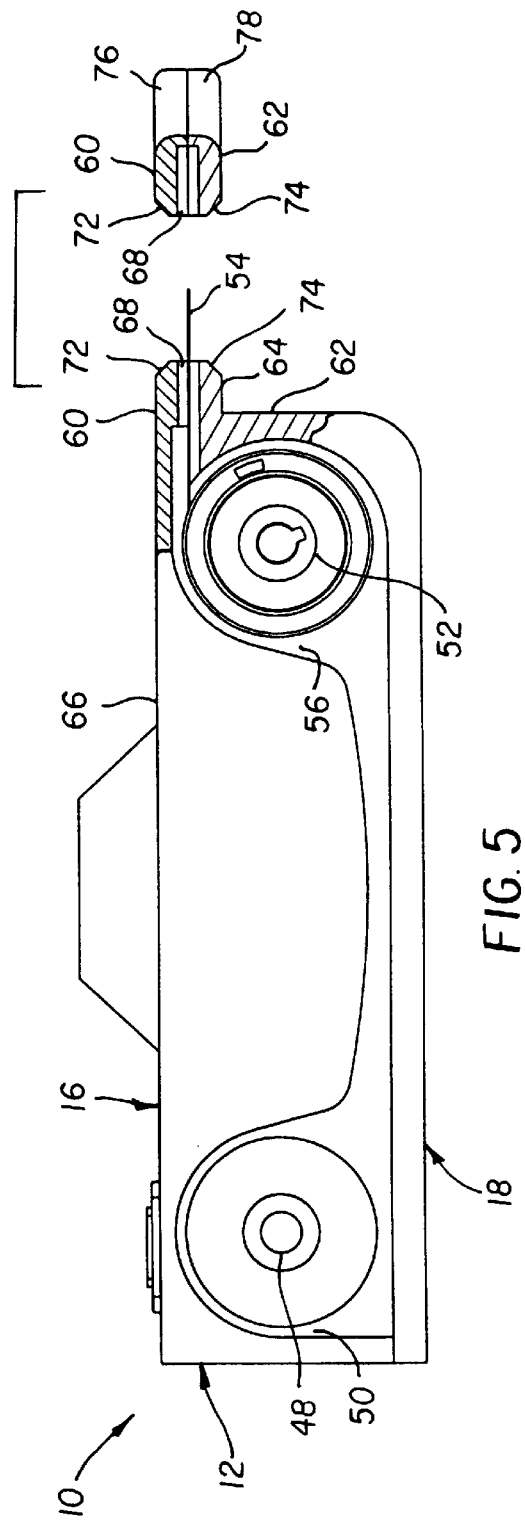

ONE-TIME-USE CAMERA WITH BREAK-OFF PROTUBERANCE FOR FILM EJECTION

FIELD OF THE INVENTION

The invention relates generally to the field of photography, and in particular to one-time-use cameras. More specifically, the invention relates to a one-time-use camera with a film exit slot that allows an exposed filmstrip to be moved from the camera.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable exposure or frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer rotates the manual thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the exposure counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Prior art U.S. Pat. No. 5,555,054 issued Sep. 10, 1996, U.S. Pat. No. 5,268,713 issued Dec. 7, 1993, U.S. Pat. No. 5,202,713 issued Apr. 13, 1993 and U.S. Pat. No. 5,148,198 issued Sep. 15, 1992 (incorporated in this application) each disclose a non-typical one-time-use camera that does not include a film cartridge for the exposed filmstrip. The main body part has a film roll chamber for the exposed filmstrip and an interior film exit slot from the chamber which allows the exposed filmstrip be moved through the slot to outside the main body part. There is no need to separate the rear cover part from the main body part to unload the exposed filmstrip.

Problem

There is a problem in the recycling, i.e. reuse, of used camera parts, in that the reused parts may become worn or damaged. Thus, it has been suggested that any worn or damaged parts be purposely fractured to render them visibly different, during disassembly of the one-time-use camera to retrieve the exposed filmstrip. This allows the worn or damaged parts to be readily identified to be discarded, and prevents them from being erroneously reused.

SUMMARY OF THE INVENTION

A one-time-use camera comprising a body having an interior film chamber for an exposed filmstrip and an interior film exit slot from the chamber which allows the exposed filmstrip be moved through the slot to outside the body, is characterized in that:

the body includes an exterior protuberance projecting from the body which partially includes the slot and has at least one weakened area adjacent the slot to permit the protuberance to be broken off from the body to open whatever portion of the slot remains with the body, in order that the exposed filmstrip can be moved to outside the body.

BRIEF DESCRIPTION OF THE DRAWINGS

FIG. 4 is a plan sectional view of the one-time-use camera as shown in FIG. 2; and FIG. 5 is a plan sectional view of the one-time-use camera as shown in FIG. 3.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
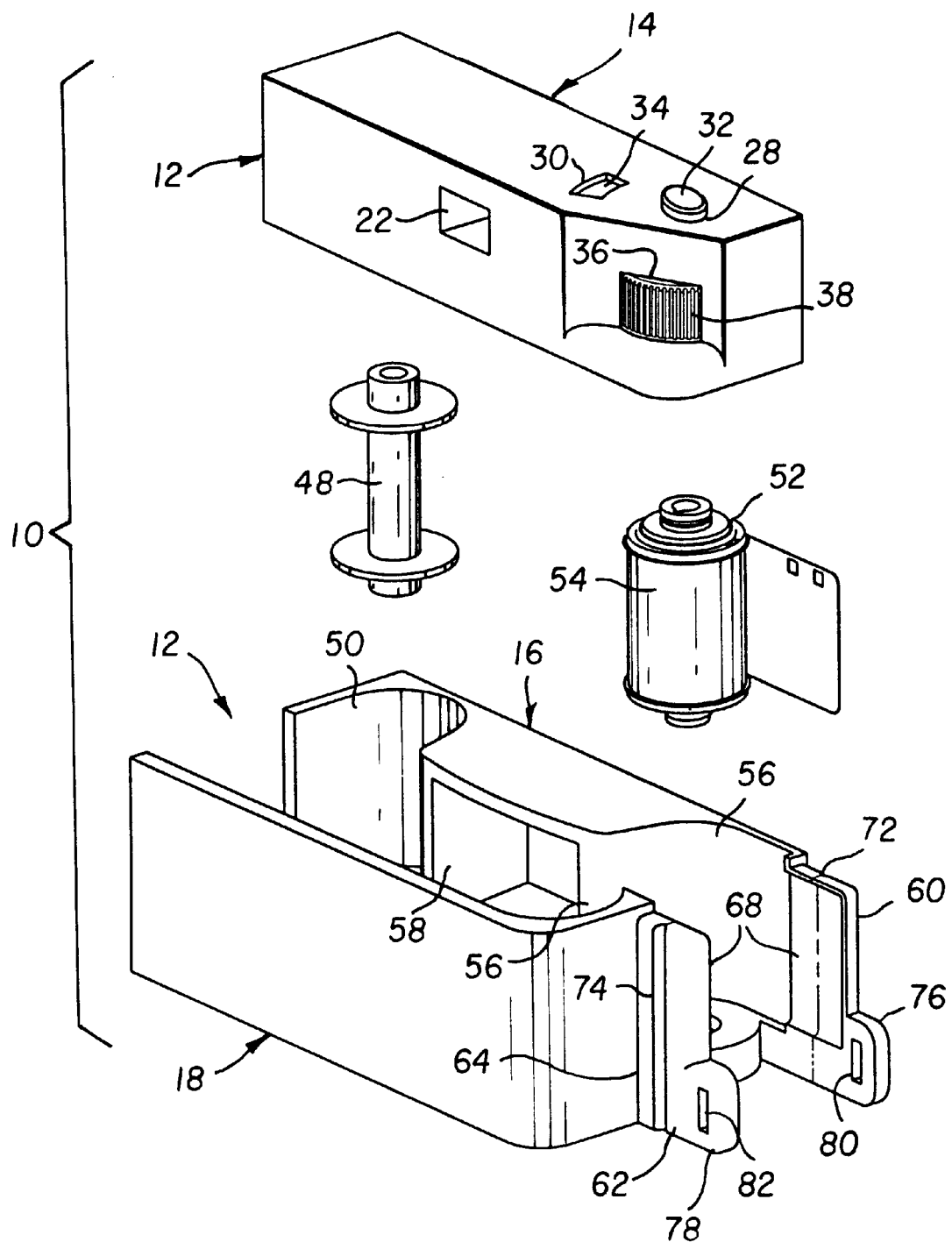
FIG. 1 is an exploded front perspective view of a one-time-use camera according to a preferred embodiment of the invention.
Figure 2:
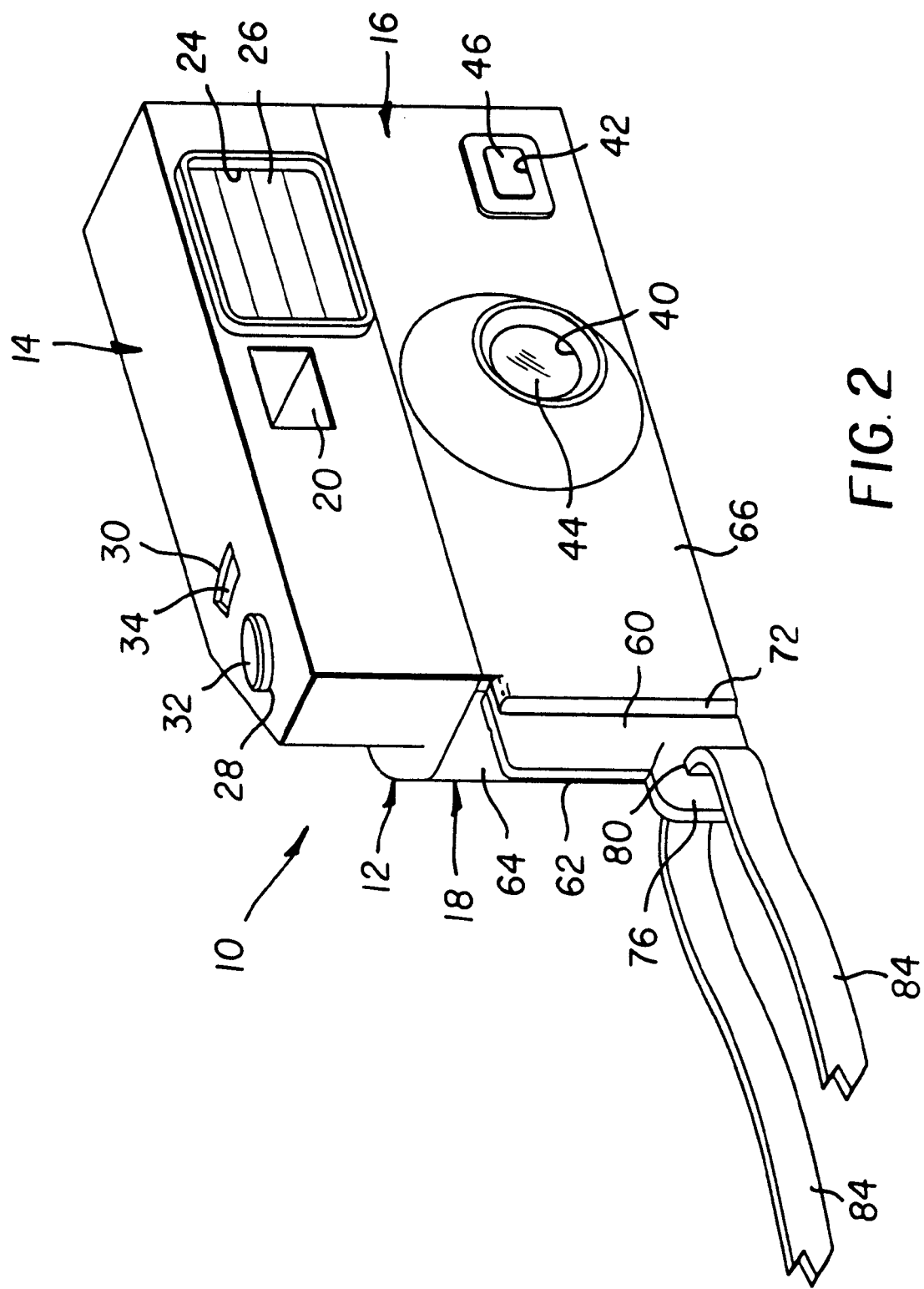
FIG. 2 is an assembled front perspective view of the one-time-use camera.

Referring now to the drawings, FIGS. 1, 2 and 4 show a one-time-use camera 10 in which the camera body 12 constitutes three individual parts, a top body part 14, a front body part 16 and a rear body part 18. The top body part 14 has front and rear viewfinder openings 20 and 22 for viewing the subject to be photographed, a front opening 24 for a flash emission window 26, respective top openings 28 and 30 for a manually depressible shutter release button 32 and an exposure counter magnifier 34, and a rear opening 36 for a manually rotatable film winding thumbwheel 38. The front body part 16 has respective front openings 40 and 42 for a taking lens 44 and a manually depressible flash activation button 46. A conventional film supply spool 48 for originally supporting an unexposed film roll (not shown) is unwindingly rotatable (counter-clockwise in FIGS. 1 and 4) within an interior chamber 50 formed by opposite portions of the front and rear body parts 16 and 18. A known film take-up spool 52 such as included in commercially available "Advanced Photo System" film cartridges, which can thrust an exposed filmstrip 54 from the spool when the spool is unwindingly rotated (clockwise in FIGS. 1 and 4), is windingly and unwindingly rotatable within an interior chamber 56 formed by opposite portions of the front and rear body parts 16 and 18. The spool 52 is coaxially connected to the thumbwheel 38 to effect winding and unwinding rotation of the spool. An anti-backup pawl (not shown) normally engages the thumbwheel 38 to prevent unwinding rotation of the thumbwheel, but permits winding rotation of the thumbwheel. The anti-backup pawl is intended to be broken to permit unwinding rotation of the thumbwheel 38. A backframe opening 58 formed by the front cover part 16 is midway between the two chambers 50 and 56 and behind the opening 40 for the taking lens 44, for exposing respective sections of the filmstrip 54 each time the shutter release button 32 is manually depressed.

Figure 3:
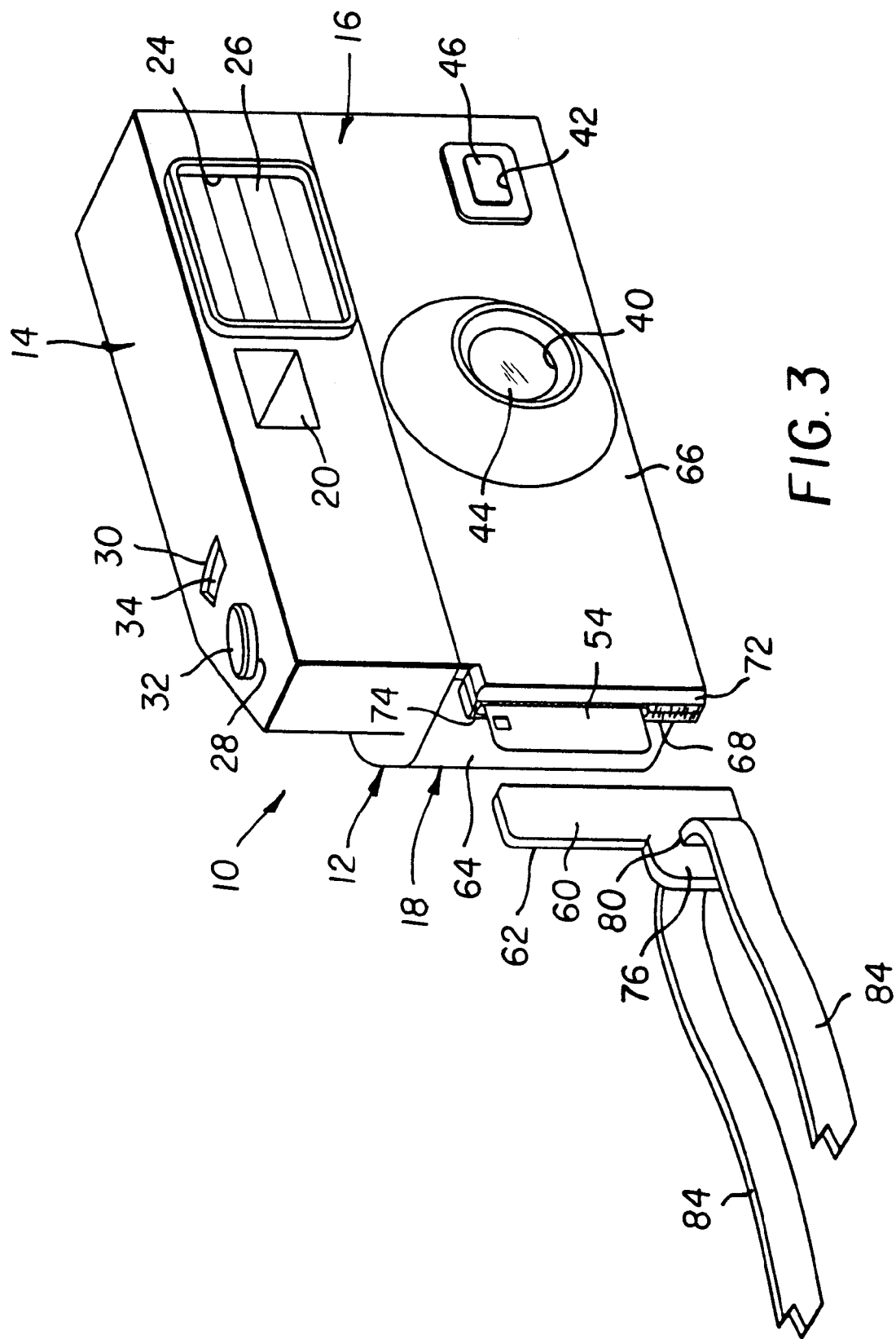
FIG. 3 is a view similar to FIG. 2, showing a protuberance broken off from the body of the one-time-use camera to permit an exposed filmstrip to be advanced through a slot to outside the body.

As shown in FIGS. 1, 2 and 4, an exterior pair of identical matching protuberance-halves 60 and 62 longitudinally project from the front and rear cover parts 16 and 18 at an end face portion 64 of the camera body 12. The end face portion 64 is substantially perpendicular to a front face portion 66 of the camera body 12 which includes the opening 40 for the taking lens 44 and the opening 42 for the flash activation button 46. A film exit slot 68 extends from the chamber 58 to between the two protuberance-halves 60 and 62, but is originally closed at one end 70 by the two protuberance-halves as shown in FIG. 4. Respective opposite weakened areas, preferably transverse v-shaped grooves 72 and 74, in the two protuberance-halves 60 and 62 permit the protuberance-halves to be manually broken off the front and rear body parts 16 and 18 as depicted in FIGS. 3 and 5. This opens whatever length of the slot 68 remains with the front and rear cover parts 16 and 18, in order that the exposed filmstrip 54 can be advanced to outside of the camera body 12 when the spool 52 is unwindingly rotated (clockwise in FIG. 5).

Respective tips 76 and 78 of the protuberance-halves 60 and 62 are located beyond the slot 68 and have aligned holes 80 and 82 for a flexible wrist-strap 84.

The invention has been described with reference to a preferred embodiment. However, it will be appreciated that variations and modifications can be effected by a person of ordinary skill in the art without departing from the scope of the invention.

PARTS LIST 10. one-time-use camera
12. camera body
14. top body part
16. front body part
18. rear body part
20. front viewfinder opening
22. rear viewfinder opening
24. front opening
26. flash emission window
28. top opening
30. top opening
32. shutter release button
34. exposure counter magnifier
36. rear opening
38. film winding thumbwheel
40. front opening
42. front opening
44. taking lens
46. flash activation button
48. film supply spool
50. interior chamber
52. film take-up spool
54. exposed filmstrip
56. interior chamber
58. backframe opening
60. protuberance-half
62. protuberance-half
64. end face portion
66. front face portion
68. film exit slot
70. end
72. v-shaped groove
74. v-shaped groove
76. tip
78. tip
80. hole
82. hole
84. wrist-strap

What is claimed is:

1. A one-time-use camera comprising a body having an interior film chamber for an exposed filmstrip and an interior film exit slot from said chamber which allows the exposed filmstrip be moved through said slot to outside said body, is characterized in that:

said body includes an exterior protuberance projecting from the body which partially includes said slot and has at least one weakened area adjacent the slot to permit said protuberance to be broken off from the body to open whatever portion of the slot remains with the body, in order that the exposed filmstrip can be moved to outside the body.

2. A one-time-use camera as recited in claim 1, wherein said weakened area is a transverse groove in said protuberance.

3. A one-time-use camera as recited in claim 1, wherein said protuberance is connected with a wrist-strap at a location beyond said slot.

4. A one-time-use camera as recited in claim 1, wherein said body includes a front face having an opening for a taking lens and an end face that is substantially perpendicular to said front face, and said protuberance projects from said end face.

5. A one-time-use camera as recited in claim 1, wherein said body constitutes a top part having front and rear viewfinder openings, a separate front part having an opening for a taking lens and one portion of said protuberance, and a separate rear part having a complementary portion of said protuberance.

6. A method of unloading an exposed filmstrip from a film chamber in a one-time-use camera comprising the step of moving the exposed filmstrip through a slot from the chamber to outside the body, is characterized in that:

an exterior protuberance projecting from the body which partially includes the slot and has at least one weakened area adjacent the slot is broken off from the body at the weakened portion to open whatever portion of the slot remains with the body, in order that the exposed filmstrip can be moved to outside the body.

7. A one-time-use camera comprising a body having an interior film chamber for an exposed filmstrip and an interior film exit slot from said chamber which allows the exposed filmstrip be moved through said slot to outside said body, is characterized in that:

said body constitutes only three individual parts, a top part having front and rear viewfinder openings, and separate front and rear parts at least one of which has said slot and said chamber; and an opening for a taking lens is formed in said front part.

8. A one-time-use camera comprising a body having an interior film chamber for an exposed filmstrip and an interior film exit slot from said chamber which allows the exposed filmstrip be moved through said slot to outside said body, is characterized in that:

said body constitutes three individual parts, a top part having front and rear viewfinder openings, a separate front part having an opening for a taking lens and respective portions of said chamber and said slot, and a separate rear part having complementary portions of said chamber and said slot.

* * * * *